United States Patent [19]

Schweizer

[11] 4,244,587
[45] Jan. 13, 1981

[54] APPARATUS FOR CLEANING RECORDS

[76] Inventor: Eduard H. Schweizer, 5101 Boarshead Rd., Minnetonka, Minn. 55343

[21] Appl. No.: 736,472

[22] Filed: Oct. 28, 1976

[51] Int. Cl.³ .................................................. G11B 3/58
[52] U.S. Cl. ..................................... 15/104.8; 15/114; 15/DIG. 14
[58] Field of Search .................... 274/47; 15/160, 184, 15/210 R, 114, 224, 185; 401/118, 191

[56] References Cited

U.S. PATENT DOCUMENTS

| | | | |
|---|---|---|---|
| 754,900 | 3/1904 | Seith et al. | 15/114 UX |
| 1,039,333 | 9/1912 | Swanson | 15/185 |
| 1,469,643 | 10/1923 | Hovey | 15/185 UX |
| 1,470,857 | 10/1923 | Lupo | 15/231 |
| 1,590,267 | 6/1926 | Trester | 15/185 |
| 1,765,065 | 6/1930 | Fear | 15/258 |
| 1,918,215 | 7/1933 | Runnels | 15/231 X |
| 1,957,591 | 5/1934 | Heckert | 15/1.5 A |
| 2,086,956 | 7/1937 | Long | 15/210 R |
| 2,173,504 | 9/1939 | Wagner | 15/258 |
| 2,504,694 | 4/1950 | Jenkins | 15/231 |
| 3,472,517 | 10/1969 | Shimono | 274/47 |

FOREIGN PATENT DOCUMENTS

| | | | |
|---|---|---|---|
| 51102 | 12/1935 | Denmark | 15/231 |
| 1198582 | 8/1965 | Fed. Rep. of Germany | 274/47 |
| 1445413 | 8/1976 | United Kingdom . | |

*Primary Examiner*—Harry N. Haroian
*Attorney, Agent, or Firm*—Wicks & Nemer

[57] ABSTRACT

Apparatus for cleaning records is shown in its preferred form including first and second liquid containers, a body member, and a cleaner element pivotally mounted to the body member. A supportive, positional recess is formed in the body member and includes first and second ribs for interlocking with first and second groove members located on the first liquid container and also preferably includes a third rib for interlocking with an indented slot located on the second liquid container. Therefore, the first and second liquid containers can be removably supported, positioned, and snuggly interfitted within the recess. The cleaner element includes a casing member and a cleaner member. The cleaner member includes a form member having cushioning material positioned over the outside surfaces thereof and further includes a cleaning cloth positioned over the remaining portions of the form member and the cushioning material. Due to the pivotal mounting of the cleaner element in the body member, the cleaner element can be positioned in a first, cleaning position where the cleaning face is exteriorly exposed of the body member allowing the cleaning face to be placed in cleaning contact with the record and can be positioned in a second, storage position where the cleaning face is located within the interior of the body member and is not exposed exteriorly of the body member.

74 Claims, 4 Drawing Figures

APPARATUS FOR CLEANING RECORDS

BACKGROUND

The present invention relates generally to apparatus for cleaning records.

With the increasing use of stereophonic and other recorded media equipment, persons have an increasing awareness of the care and preservation required of the recorded media in the form of fragile phonograph records. Therefore, a need has arisen for devices for cleaning records.

A major problem in record cleanliness is pocketed electron charges, which is a condition attracting and holding dust and airborne pollutants to the record surface. Additionally, this condition creates an ideal environment for the maintenance of microorganisms. Therefore, a need has further arisen for apparatus for cleaning records by eliminating the plus and minus electrons (static charges) held on the record surface and for eliminating all microorganisms, dust, and other pollutants which may be also located on the record.

Further, a need has arisen for apparatus for cleaning records that is of a simple design, easy to use, the maximizes the material used.

SUMMARY

The present invention solves these and other problems in apparatus for cleaning records by providing, in the preferred embodiment, apparatus including a body member and a cleaner element.

In a preferred form, the cleaner element includes means for pivotally mounting the cleaner element to the body member allowing the cleaner element to be positioned in a first, cleaning position and a second, storage position.

In the preferred embodiment, the apparatus for cleaning records also includes liquid container members removably supported and positioned within the body member.

Additionally, in the preferred embodiment, the cleaner element includes a cleaner member including a form member having cushioning material located on the outside surface of the form member, and record cleaning cloth positioned over the cushioning material and the remaining portions of the form member and attached at the marginal edges thereof and not within the cleaning area thereof.

It it thus an object of the present invention to provide novel apparatus for cleaning records.

It is further an object of the present invention to provide such novel apparatus for cleaning records which preserves the cleanliness of the cleaning face of the apparatus.

It is further an object of the present invention to provide such novel apparatus for cleaning records which is of simple design and can be manufactured at a low cost.

It is further an object of the present invention to provide such apparatus for cleaning records including removably supported and positioned liquid container members.

It is further an object of the present invention to provide such novel apparatus for cleaning records including a novel cleaner member.

These and further objects and advantages of the present invention will become clearer in light of the following detailed description of the illustrative embodiment of this invention described in connection with the drawings.

DESCRIPTION OF THE DRAWINGS

The illustrative embodiment may best be described by reference to the accompanying drawings where.

All figures are drawn for ease of explanation of the basic teachings of the present invention only. The extension of the figures with respect to number, position, relationship, or dimensions of the parts to form the preferred embodiment will be explained or be obvious from the explanation set out.

Where used in the various figures of the drawings, the same or similar numerals designate the same or similar parts of the various members of the apparatus for cleaning records. Furthermore, when the terms "right", "left", "first", "second", and similar terms are used herein, it should be understood that these terms have reference only to the structure shown in the drawings as it would appear to a person viewing the drawings and are utilized only to facilitate describing the invention.

DESCRIPTION

Figures 1, 2, 3, 4:
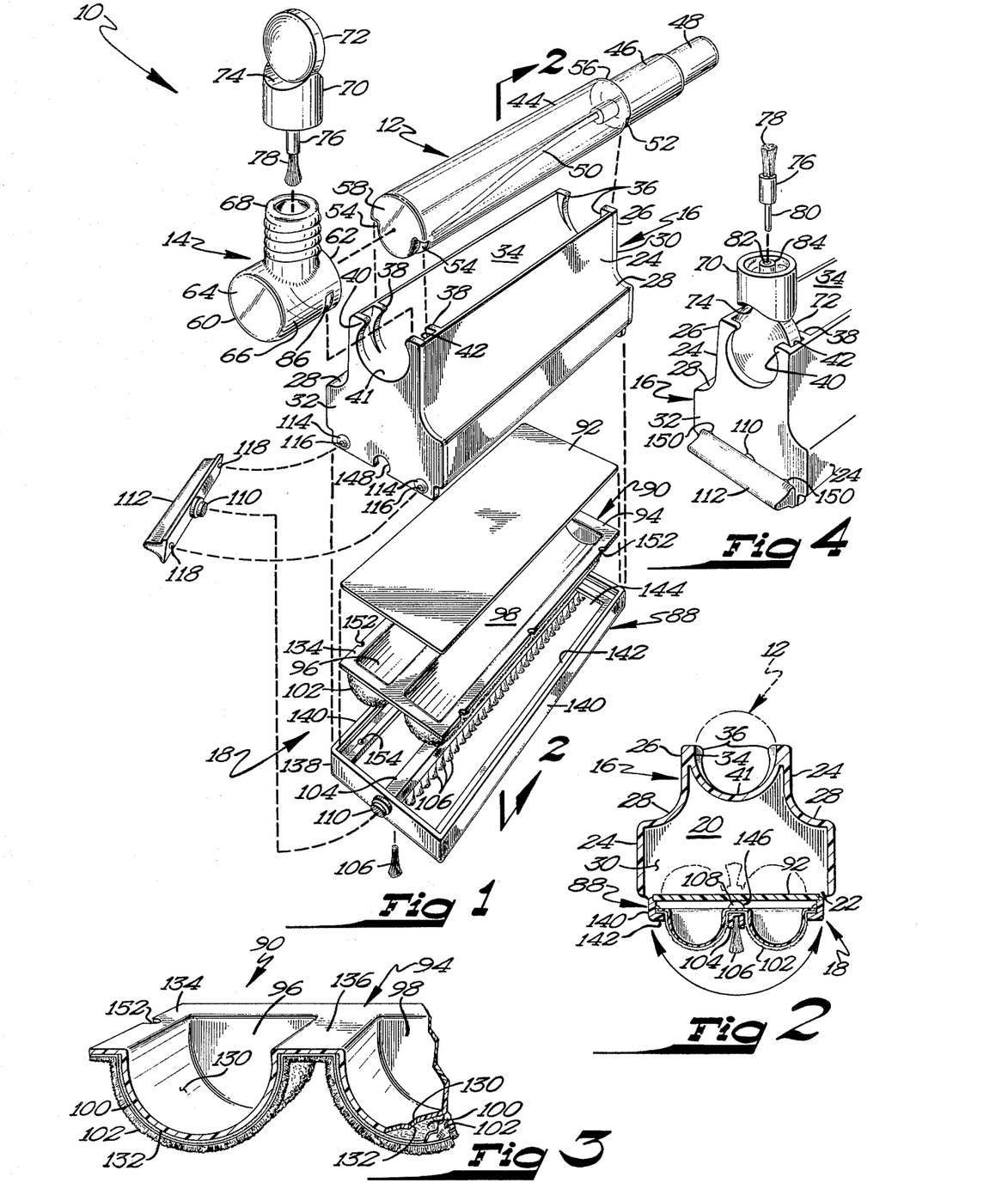
FIG. 1 shows an exploded, perspective view of apparatus for cleaning records according to the teachings of the present invention.
FIG. 2 shows a cross sectional view of the apparatus of FIG. 1 according to section line 2—2 of FIG. 1.
FIG. 3 shows a partial, sectional, perspective view of the cleaner member of the apparatus of FIG. 1.
FIG. 4 shows a partial, perspective view of the apparatus of FIG. 1.

In the figures, apparatus for cleaning records, according to the teachings of the present invention, is generally shown and designated 10. Apparatus 10 generally includes a first liquid container 12, a second liquid container 14, a body member 16, and a cleaner element 18 pivotably mounted to body member 16. Body member 16 is a rigid, hollow, thin-walled elongated structure including: a cavernous interior 20 having an open base 22; upstanding sides 24 having a narrowed portion 26 forming a recessed, top positioned handle portion for grasping by the fingers of the user and including finger abutment, curved portions 28; right end wall 30; and left end wall 32. Narrowed portion 26 further includes a supportive, positional recess 34 having a semi-circular cross section for purposes that will be explained further hereinafter. Formed within recess 34 are: first interlocking rib 36 partially extending into recess 34 and, in the preferred embodiment, formed by endwall 30; second interlocking rib 38 partially extending into recess 34 and, in the preferred embodiment, between end walls 30 and 32; and third interlocking rib 40 partially extending into recess 34 and, in the preferred embodiment, formed by end wall 32. In the preferred embodiment, third interlocking rib 40 is spaced a short distance from second interlocking rib 38 on the side opposite rib 36 thereby forming a channel portion 42 within recess 34 and between ribs 38 and 40.

In the preferred form, first liquid container 12 is an elongated bottle member 44 having a circular cross section, with the diameter of bottle member 44 being approximately equal to the diameter of the semi-circular cross section of recess 34 such that bottle member 44 fits within recess 34. Thus, recess 34 has a shape complementary to and for receiving bottle member 44 as will be explained further hereinafter. Bottle member 44 includes a closure member 46 formed on one end 56 of bottle member 44 and has an atomizer nozzle 48 formed therein for dispensing liquid located in bottle member 44 onto the record. Atomizer nozzle 48 can be of the conventional type and includes a tube 50 for supplying liquid located within the interior of bottle member 44 to nozzle 48.

Bottle member 44 further includes a first interlocking groove member 52 having a shape complementary with rib 36 and a second interlocking groove member 54 having a shape complementary with rib 38. In the preferred form, groove member 52 is formed in and adjacent to end 56 of bottle member 44 adjacent to closure member 46, and groove member 54 is formed in and adjacent to the end 58 of bottle member 44 opposite closure member 46.

It should then be noted that bottle member 44 can be removably supported and positioned within recess 34 such that rib 36 is located within groove member 52, and rib 38 is located within groove member 54, and bottle member 44 is snuggly interfitted within recess 34. Therefore, ribs 36 and 38 and groove members 52 and 54 allow positioning and maintaining bottle member 44 within recess 34. It should further be noted that, due to the semi-circular cross section of recess 34, one-half of bottle member 44 extends above the top of narrowed portion 26.

Therefore, it should be noted that bottle member 44 and narrowed portion 26 form a gripping portion intended to be gripped by the hand of the user. Finger abutment, curved portion 28 then prevents further movement of the finger therebelow. Therefore, the fingers of the user will not slip past curved portion 28.

Second liquid container member 14 is shown in its preferred form as being a shortened, bottle member 60 having a circular cross section. The diameter of bottle member 60 is approximately equal to the diameter of bottle member 44 and the diameter of the circular cross section of recess 34. Thus, recess 34 has a shape complementary to and for receiving bottle member 60, as will be explained further hereinafter. Bottle member 60 includes a first end 62, a second end 64, and a perimeter side wall portion 66. Bottle member 60 further includes a top directed outlet 68 formed in side wall portion 66. Outlet 68 includes a closure member 70 which may be threadably engaged to outlet 68.

Closure member 70 further includes a disc shaped member 72 vertically and perpendicularly upstanding therefrom. In the preferred embodiment, member 72 has a circular shape having a diameter equal to the diameter of bottle member 44, of recess 34, and of bottle member 60, and has a width equal to the width of channel portion 42. Closure member 70 further includes arcuate recess portion 74 formed therein.

Closure member 70 further includes a brush member 76 having bristles 78 formed on one end thereof and having a pin member 80 which is removably received in a cavity 82 formed in a depending boss 84 of closure member 70. In the preferred form, brush member 76 is a stylus cleaning brush, closure member 70 is used as the holder for brush member 76, and disc 72 provides a handle to be gripped by the hand of the user to effectuate this purpose.

It should further be noted that disc 72 can be removably positioned within channel portion 42 such that disc 72 is snuggly interfitted within channel portion 42 as best seen in FIG. 4. Additionally, bottle member 44 can simultaneously be located within recess 34 with disc 72 in that bottle member 44 is positioned within recess 74 of closure member 70 such that bottle member 44 is abutted by recess portion 74.

Bottle member 60 further includes an indented slot member 86 having a shape complementary to rib 40. Therefore, bottle member 60 can be removably positioned within recess 34 such that rib 40 is located within slot member 86 and such that end 62 of bottle member 60 abuts with end 58 of bottle member 44, as best seen in FIG. 1. Thus, rib 40 and slot member 86 allows positioning and maintaining bottle member 60 within recess 34 in a manner analogous to ribs 36 and 38 and groove members 52 and 54 explained hereinbefore with respect to bottle member 44.

It thus should be noted that, in the preferred embodiment, the portion of bottle member 60 extending from slot member 86 toward end 64 overhangs body member 16, or in other words, extends beyond end wall 32 of body member 16.

As best seen in FIG. 2, it should additionally be noted that, in the preferred embodiment, ribs 36, 38, and 40 are generally parabolic in shape with the bottom of the parabola being generally at the same level as the bottom of recess 34 such that ribs 36, 38, and 40 and recess 34 provide a smooth bottommost portion 41. Therefore, the interference of ribs 36, 38, and 40 with bottle members 44 and 60 is minimized. For example, rib 36 does not interfere with closure member 46 of bottle member 88.

Cleaner element 18 generally includes a cleaning face and a supporting face and specifically includes a casing member 88, and a cleaner member 90. As best seen in FIG. 3, cleaner member 90 generally includes a rectangularly shaped, plastic form member 94 having a first elongated trough member 96 and a second elongated trough member 98 located parallel to and slightly horizontally spaced from trough member 96. Trough members 96 and 98 include inside surface 130 and outside, cleaningly directed surface 132. Therefore, form member 94 is divided into a cleaning area defined by surfaces 132 of trough members 96 and 98 and remaining areas defined by a rectangular marginal edge 134 around trough members 96 and 98 and elongated marginal edge 136 located between trough members 96 and 98. In the preferred embodiment, plastic form member 94 is made by a vacuum, blister type process that is conventional in the plastic art. However, other processes well known in the plastic art, such as a heat and pressure process or extrusion process can be utilized in forming plastic form member 94.

Cushioning or softening material 100 is placed on the cleaning surfaces 132 of trough members 96 and 98 of plastic form member 94 as best shown in FIG. 3. Record cleaning cloth 102, such as velvet, is then positioned over material 100 and edge 134 and edge 136 defining the remaining portions of plastic form member 94. Cloth 102 is then attached to marginal edges 134 and 136 of form members 94 by high frequency sealing and pressure plastic type process that is conventional in the plastic art but heretofore unknown in the record cleaning apparatus art.

Prior to the present invention, record cleaning cloth was generally attached to the record cleaning apparatus by the use of adhesive material such as glue. Such apparatus suffered from severe limitations in that the glue would leach through the record cleaning cloth and therefore be deposited on and cause damage to record surface. Further, when record cleaning fluid was used with such record cleaning apparatus, the glue would mix with the record cleaning fluid and therefore be spread upon the record. Additionally, the record cleaning cloth was also prone to detach from the record cleaning apparatus.

To avoid these limitations in using adhesive material, other record cleaning apparatus attached the recording cleaning cloth thereto by hand stitching the record cleaning cloth to the record cleaning apparatus. However, such record cleaning apparatus are very expensive to manufacture in that extensive hand labor is required.

The present invention solves these problems by providing a cleaner member 90 positioned within casing member 88 as explained herein. It should then be noted that cloth 102 is not attached to trough members 96 and 98 but rather is stretched over surfaces 132 of trough members 96 and 98. Further, it should be noted that no glue of any kind is used in the attachment of cloth 102 to plastic form member 94. Additionally, cleaner member 90 lends itself to mass production techniques and therefore can be manufactured at a low cost. For example, numerous cleaner members 90 can be simultaneously made in sheets attached by their marginal edges 134 and cut into individual members 90 after their formation including the placement of material 100 and the attachment of cloth 102 to form member 94.

As best seen in FIGS. 1 and 2, casing member 88 includes a rectangularly shaped member 138 having a shape and size corresponding to cleaner member 90. A cover member 92 is also included. Member 138 includes rectangular perimeter side walls 140, a lip member 142 attached to side walls 140 and extending perpendicular thereto and around the perimeter of member 138. A support bar member 104 is also included. In the preferred embodiment, support member 104 is a brush back member and further includes suitable brush bristles 106 for use in cleaning records. It should further be noted that member 138 has an open back 144.

Cleaner member 90 can then be dropped through open back 144 into member 138 such that edge 134 rests on and is supported by lip member 142 and edge 136 rests on and is supported by support member 104. Therefore, lip member 142 supports cleaner member 90 by marginal edge 134 and support member 104 supports cleaner member 90 by marginal edge 136 located between trough members 96 and 98.

Cover member 92 interfits with member 138 and is attached thereto by any suitable method such as by adhesive. Therefore cleaner member 90 is secured within member 138 by cover member 92. In the preferred embodiment, notches 152 are formed in edge 134 of cleaner member 90 for interferring and interlocking with upstanding members 154 formed on member 138 to further secure cleaner member 90 within member 138.

For pivotally mounting cleaner element 18 to body member 16, casing member 88 further includes a first pivot pin 108 which extends through a snap-in aperture 146 formed in end wall 30 and is thus pivotally mounted to end wall 30 of body member 16. Further included is a second pivot pin 110 on casing 88 which extends through a snap-in aperture 148 formed in end wall 32 of body member 16 and thus similarly pivotally mounts casing 88 to end wall 32 of body member 16. In the preferred embodiment, pivot pins 108 and 110 extend from side walls 140 of member 138 and are similarly constructed.

A handle extension member 112 is attached to pivot pin 110 for pivoting cleaner element 18 within body member 16 from a first, cleaning position as shown in solid in FIG. 2 to a second, storage position as shown in phantom in FIG. 2.

Apparatus 10 further includes first and second members 150 for holding cleaner element 18 in the desired position as best seen in FIGS. 1 and 2. Specifically, members 150 include raised portions 114 formed on end wall 32 having an indent member 116 formed therein. Handle member 112 further includes first and second detent members 118 formed thereon for engaging with indent members 116 of raised portions 114, as best seen in FIG. 1.

It should then be noted that when cleaner element 18 is located in its first, cleaning position as shown in solid in FIG. 2, the cleaning face of cleaner member 18 is exteriorly exposed of body member 16 allowing the cleaning face to be placed in cleaning contact with the record. Specifically, cloth 102 and bristles 106 are exteriorly exposed of body member 16. In the preferred embodiment, cover member 92 in the first position is located within interior 20 of body member 16.

It should then be noted that when cleaner element 18 is located in its second, storage position as shown in phantom in FIG. 2, the cleaning face of cleaner element 18 is located within interior 20 of the body member and not exteriorly exposed of the body member for preserving the cleanliness of the cleaning face and avoiding contact between the cleaning face and other material thus preventing the material or contaminants located thereon from transferring to the cleaning face or the contaminants located on the cleaning face from being transferred to the material. Specifically, cloth 102 and bristles 106 are located within interior 20 of body member 16.

In the second, storage position, the supporting face of cleaner element 18 is exteriorly exposed of body member 16 for providing a supporting base for apparatus 10. Specifically, cover member 92 is exteriorly exposed of body member 16 and provides a supporting base for apparatus 10 in that cover member 92 can rest on and be supported by a support surface when not in use.

Assuming, for the sake of example, that cleaner element 18 is located in its second, storage, position, when it is desired to clean a record, the following steps are taken. First, handle member 112 is turned such that detent members 118 are removed from indent members 116 of raised portions 114. Cleaner element 18 is then pivoted to its first, position wherein detent members 118 again engage indent members 116 and hold cleaner element 18 in the first, cleaning, position.

With cleaner element 18 in its first position, the cleaning face of cleaner element 18 can be brought in cleaning contact with the record. At this time, apparatus 10 can be moved in a circular motion upon the upper surface of a record, or can be held in a stationary position and the record rotated under the cleaning face of cleaner element 18, for example, if the record was located on a revolving turntable.

It should be noted that record cleaning fluid can be applied to the record surface by actuating the atomizer nozzle 48 in a conventional manner.

After the record surface has been cleaned, cleaner element 18 can again be pivoted from its first position, as shown in solid in FIG. 2, to its second position, as shown in phantom in FIG. 2.

If it is desired to clean the stylus of the tone arm of the turntable, closure member 70 can be unscrewed from outlet 68, and bristles 78 of brush member 76 can be used to clean the stylus. It should be noted that record cleaning fluid can be placed within the interior of bottle member 60 such that bristles 78 are located therein when not in use and therefore be in engagement with the cleaning fluid when it is desired to use brush member 76. Further, if it is not desired to use record cleaning fluid, bottle 60 prevents the undesirable contamination of bristles 78 in that bottle 60 and closure member 70 seals bristles 78 within the interior thereof and therefore prevents contaminants from the atmosphere from contacting therewith.

If it is not desired to use bottle 60 as shown in FIGS. 1 and 3 of the present invention, closure member 70 can be positioned as shown in FIG. 4. Further, bottle member 60 can be threadably engaged with closure member 70 in the position as shown in FIG. 4, if desired.

Now that the basic teachings of the present invention have been explained, many extensions and variations will be obvious to one having ordinary skill in the art. For example, although, in the preferred embodiment, several novel features unknown in the record cleaning art have been combined in a single apparatus, apparatus including one or more of such features can be manufactured in view of the teachings of the present specification and each such separate apparatus is intended to be embraced herein and defined by the appended claims. For example, a suitable nonpivotable, directly attached handle member can be provided to cleaner element 18 as taught by the present specification and used to clean records.

Thus since the invention disclosed herein may be embodied in other specific forms without departing from the spirit or the general characteristics thereof, some of which forms have been indicated, the embodiments described herein are to be considered in all respects illustrative and not restrictive. The scope of the invention is indicated by the appended claims, rather than by the foregoing description, and all changes which come within the meaning and range of equivalency of the claims are intended to be embraced therein.

What is claimed is:

1. Apparatus for cleaning records comprising, in combination: a body member including a cavernous interior having an open base and including a handle portion for grasping by the fingers of the user; a cleaner element having a cleaning face and a supporting face; means for pivotally mounting the cleaner element to the body member allowing the cleaner element to be positioned in a first, cleaning position where the cleaning face is exteriorly exposed of the body member allowing the cleaning face to be placed in cleaning contact with the records and in a second, storage position where the cleaning face is located within the interior of the body member and not exteriorly exposed of the body member for preserving the cleanliness of the cleaning face and avoiding contact between the cleaning face and other material thus preventing the material or the contaminants located thereon to be transferred to the cleaning face or the contaminants located on the cleaning face from being transferred to the material and for allowing the supporting face to be exteriorly exposed of the body member for providing a supporting base for the apparatus; a liquid container having a shape; and means for dispensing liquid located in the liquid container onto the record; and wherein the handle portion of the body member includes a supportive, positional recess having a shape complementary to and for receiving the liquid container and wherein the apparatus further comprises means for positioning and maintaining the liquid container within the supportive, positional recess.

2. The apparatus of claim 1 wherein the positioning and maintaining means comprises, in combination: a first interlocking rib; a second interlocking rib, with the first and second interlocking ribs formed within the supportive, positional recess; a first interlocking groove member having a shape complementary with the first interlocking rib; and a second interlocking groove member having a shape complementary with the second interlocking rib, with the first and second interlocking groove members being formed on the liquid container such that the liquid container can be removably supported and positioned within the recess such that the first rib is located in the first groove member and the second rib is located in the second groove member allowing the liquid container to be snuggly interfitted within the recess.

3. The apparatus of claim 2 further comprising, in combination: a third interlocking rib formed within the supportive, positional recess spaced a short distance from the second interlocking rib on the side opposite the first interlocking rib for forming a channel portion within the recess between the second and third ribs.

4. The apparatus of claim 3 further comprising, in combination: a brush member, and means for providing a handle for gripping by the hand of the user, with the handle providing means comprising a disc shaped member having a width equal to the short distance which second and third ribs are spaced, and wherein the disc shaped member can be snuggly interfitted within the channel portion.

5. The apparatus of claim 4 further comprising, in combination: a second liquid container including a closure member, wherein the closure member includes the disc shaped member vertically and perpendicularly upstanding from the closure member, the brush member, and a recess portion, and wherein the first liquid container can be positioned within the recess and abutted by the recess portion of the closure member.

6. The apparatus of claim 5 wherein the second liquid container includes an indented slot having a shape complementary to the third interlocking rib such that the second liquid container can be removably supported and positioned within the recess such that the third rib is located in the indented slot of the second liquid container and such that the second liquid container abuts with the second rib and the first liquid container.

7. The apparatus of claim 3 further comprising, in combination: a second liquid container, with the second liquid container including an indented slot having a shape complementary to the third interlocking rib such that the second liquid container can be removably supported and positioned within the recess such that the third rib is located in the indented slot of the second liquid container and such that the second liquid container abuts with the second rib and the first liquid container.

8. The apparatus of claim 7 wherein the second liquid container further includes a closure member, and wherein the closure member includes a disc shaped member vertically and perpendiculary upstanding from the closure member, a recess portion, and a brush member, with the disc shaped member having a width equal to the short distance which the second and third ribs are spaced, and wherein the disc shaped member can be snuggly interfitted within the channel portion and wherein the first liquid container can be positioned within the recess and abutted by the recess portion of the closure member.

9. The apparatus of claim 2 wherein the body member includes first and second upstanding sides, with the sides having a narrowed portion forming the handle portion; a right end wall; and a left end wall; and wherein the first interlocking rib is formed by the right end wall partially extending into the supportive, positional recess.

10. The apparatus of claim 9 wherein the pivotably mounting means comprises pivot pins attached to the cleaner element and extending through and pivotally mounted to the end walls of the body member.

11. The apparatus of claim 1 wherein the supportive, positional recess has a semi-circular cross section having a diameter; and wherein the liquid container has a circular cross section, with the diameter of the liquid container being approximately equal to the diameter of the semi-circular cross section of the supportive, positional recess.

12. The apparatus of claim 11 wherein the interlocking ribs are generally parabolic in shape with the bottom of the parabola being generally at the same level as the bottom of the supportive, positional recess for providing a smooth bottommost portion so interference by the interlocking ribs with the liquid container is minimized.

13. Apparatus for cleaning records comprising, in combination: a body member including a cavernous interior having an open base and including a handle portion for grasping by the fingers of the user; a cleaner element having a cleaning face and a supporting face, with the cleaner element comprising, in combination: a casing member, and a cleaner member, with the cleaner member comprising, in combination: a form member having a first elongated trough member and a second elongated trough member parallel to and slightly spaced from the first trough member, with the trough members having inside and outside surfaces, with the outside surfaces of the trough members defining a cleaning area, and with a remaining area defined by marginal edges around and between the first and second trough members, cushioning material located on the outside surfaces of the first and second trough members, and record cleaning cloth positioned over the cushioning material and the remaining area of the form member with the record cleaning cloth being attached along the marginal edges thereof and not in the cleaning area thereof; and means for pivotally mounting the cleaner element to the body member allowing the cleaner element to be positioned in a first, cleaning position where the cleaning face is exteriorly exposed of the body member allowing the cleaning face to be placed in cleaning contact with the records and in a second, storage position where the cleaning face is located within the interior of the body member for preserving the cleanliness of the cleaning face and avoiding contact between the cleaning face and other material thus preventing the material or the contaminants located thereon to be transferred to the cleaning face or the contaminants located on the cleaning face from being transferred to the material and for allowing the supporting face to be exteriorly exposed of the body member for providing a supporting base for the apparatus.

14. The apparatus of claim 13 wherein the casing member has a size and shape corresponding to the cleaner member and includes means for supporting the marginal edge of the cleaner member.

15. The apparatus of claim 14 wherein the casing member includes perimeter side walls and wherein the means for supporting the marginal edge of the cleaner member comprises a lip member attached to the side walls of the casing member and extending around the perimeter of the casing member, and a support bar member extending between the side walls of the casing member for supporting the marginal edge of the cleaner member between the first and second trough members.

16. The apparatus of claim 15 wherein the support bar member is a brush back member and wherein the brush back member further includes brush bristles for use in cleaning records.

17. The apparatus of claim 16 wherein the body member further comprises a first end wall and a second end wall and wherein the pivotally mounting means comprises pivot pins attached to the casing member and extending through and pivotally mounted to the end walls of the body member.

18. The apparatus of claim 17 further comprises a handle extension member attached to one of the pivot pins of the cleaner element.

19. The apparatus of claim 18 further including means for locking the cleaner element in the desired position.

20. The apparatus of claim 19 wherein the locking means comprises a detent member formed on the handle extension member and raised porions having an indent member formed on one of the end walls of the body member for engaging with the detent member.

21. Apparatus for cleaning records comprising, in combination: a body member including a cavernous interior having an open base and including a handle portion for grasping by the fingers of the user; a cleaner element having a cleaning face and a supporting face, with the cleaner element including a cleaner member comprising, in combination: a form member having a cleaning area and a marginal edge, and record cleaning cloth positioned over the form member and attached along the marginal edge of the form member, and further including a casing member having a size and shape corresponding to the cleaner member and including means for supporting the marginal edge of the cleaner member; and means for pivotally mounting the cleaner element to the body member allowing the cleaner element to be positioned in a first, cleaning position where the cleaning face is exteriorly exposed of the body member allowing the cleaning face to be placed in cleaning contact with the records and in a second, storage position where the cleaning face is located within the interior of the body member and not exteriorly exposed of the body member for preserving the cleanliness of the cleaning face and avoiding contact between the cleaning face and other material thus preventing the material or the contaminants located thereon to be transferred to the cleaning face or the contaminants located on the cleaning face from being transferred to the material and for allowing the supporting face to be exteriorly exposed of the body member for providing a supporting base for the apparatus.

22. The apparatus of claim 21 wherein the casing member includes perimeter side walls and wherein the means for supporting the marginal edge of the cleaner member comprises a lip member attached to the side walls of the casing member and extending around the perimeter of the casing member.

23. Cleaner member for cleaning records comprising, in combination: a form member including a first surface and a second, record cleaningly directed surface, with the second surface having a cleaning area and a remaining area defining a marginal edge; and cloth for cleaning records when placed in cleaning contact therewith during relative movement between the cleaner member and the record, with the record cleaning cloth being positioned over the second surface of the form member and being attached along the marginal edge of the form member, with the cleaner member being received in a casing member having a size and shape corresponding to the cleaner member and having means for supporting the marginal edge of the cleaner member wherein the cleaner member can simply be dropped as a single unit including the form member and the record cleaning cloth attached thereto into the casing member such that the marginal edge rests on and is supported by the means for supporting the marginal edge of the cleaner member.

24. The cleaner member of claim 23 wherein the form member includes a first elongated trough member and a second elongated trough member parallel to and slightly spaced from the first trough member, with the trough members having inside and outside surfaces, with the outside surfaces of the trough members defining the cleaning area, and with the marginal edge defined by the remaining area around and between the first and second trough members.

25. The cleaner member of claim 24 wherein the record cleaning cloth is only attached along the marginal edge and not in the cleaning area of the second surface of the form member.

26. The cleaner member of claim 25 further comprising, in combination: cushioning material located on the cleaning area of the second surface of the form member, and wherein the record cleaning cloth is positioned over the cushioning material.

27. The cleaner member of claim 24 wherein the casing member includes perimeter side walls and wherein the means for supporting the marginal edge of the cleaner member comprises a lip member attached to the sidewalls of the casing member and extending around the perimeter of the casing member, and a support bar member extending between the sidewalls of the casing member for supporting the marginal edge of the cleaner member between the first and second trough members.

28. The cleaner member of claim 27 wherein the support bar member is a brush back member and wherein the brush back member further includes brush bristles for use in cleaning records.

29. The cleaner member of claim 23 wherein the casing member includes a perimeter side walls and wherein the means for supporting the marginal edge of the cleaner member comprises a lip member attached to the sidewalls of the casing member and extending around the perimeter of the casing member.

30. The cleaner member of claim 23 wherein the record cleaning cloth is only attached along the marginal edges and not in the cleaning area of the second surface of the form member.

31. The cleaner member of claim 30 further comprising, in combination: cushioning material located on the cleaning area of the second surface of the form member, and wherein the record cleaning cloth is positioned over the cushioning material.

32. Cleaner member for cleaning records comprising, in combination: a form member including a first surface and a second cleaningly directed surface, with the form member including a first elongated trough member and a second elongated trough member parallel to and slightly spaced from the first trough member, with the trough members having inside and outside surfaces, with the outside surfaces of the trough members defining a cleaning area, and with a marginal edge defined by the remaining area around and between the first and second trough members; and record cleaning cloth positioned over the second surface of the form member and attached along the marginal edge of the form member, wherein the cleaner member is received in a casing member having a size and shape corresponding to the cleaner member and having perimeter side walls and having means for supporting the marginal edge of the cleaner member comprising a lip member attached to the sidewalls of the casing member and extending around the perimeter of the casing member, and a support bar member extending between the sidewalls of the casing member for supporting the marginal edge of the cleaner member between the first and second trough members.

33. The cleaner member of claim 32 wherein the support bar member is a brush back member and wherein the brush back member further includes brush bristles for use in cleaning records.

34. The cleaner member of claim 32 wherein the record cleaning cloth is only attached along the marginal edge and not in the cleaning area of the second surface of the form member.

35. Apparatus for cleaning records comprising, in combination: a body member including a handle portion for grasping by the fingers of the user; a cleaner element mounted to the body member; and a liquid container having a shape and including a closure member; and wherein the handle portion of the body member includes a supportive, positional recess having a shape complementary to and for receiving the liquid container and wherein the apparatus further comprises means for positioning and maintaining the liquid container within the supportive, positional recess comprising, in combination: a first interlocking rib; a second interlocking rib, with the first and second interlocking ribs formed within the supportive, positional recess; a first interlocking groove member having a shape complementary with the first interlocking rib; and a second interlocking groove member having a shape complementary with the second interlocking rib, with the first and second interlocking groove members being formed on the liquid container such that the liquid container can be removably supported and positioned within the recess such that the first rib is located in the first groove member and the second rib is located in the second groove member allowing the liquid container to be snuggly interfitted within the recess.

36. The apparatus of claim 35 wherein the body member includes first and second upstanding sides, with the sides having a narrowed portion forming the handle portion; a right end wall; and a left end wall; and wherein the first interlocking rib is formed by the right end wall partially extending into the supportive, positional recess.

37. The apparatus of claim 36 further comprising, in combination: a third interlocking rib formed within the supportive positional recess spaced a short distance from the second interlocking rib on the side opposite the first interlocking rib for forming a channel portion within the recess between the second and third ribs.

38. The apparatus of claim 37 wherein the third interlocking rib is formed by the left end wall partially extending into the supportive, positional recess.

39. The apparatus of claim 35 wherein the supportive, positional recess has a semi-circular cross section having a diameter, and wherein the liquid container has a circular cross section, with the diameter of the liquid container being approximately equal to the diameter of the semi-circular cross section of the supportive, positional recess.

40. The apparatus of claim 39 wherein the interlocking ribs are generally parabolic in shape with the bottom of the parabola being generally at the same level as the bottom of the supportive, positional recess for providing a smooth bottommost portion so interference by the interlocking ribs with the liquid container is minimized.

41. The apparatus of claim 35 further comprising, in combination: a third interlocking rib formed within the supportive, positional recess spaced a short distance from the second interlocking rib on the side opposite the first interlocking rib for forming a channel portion within the recess between the second and third ribs.

42. The apparatus of claim 41 further comprising, in combination: a second liquid container, with the second liquid container including an intended slot having a shape complementary to the third interlocking rib such that the second liquid container can be removably supported and positioned within the recess such that the third rib is located in the intended slot of the second liquid container and such that the second liquid container abuts with the second rib and the first liquid container.

43. The apparatus of claim 42 wherein the second liquid container further includes a closure member, and wherein the closure member includes a disc shaped member vertically and perpendicularly upstanding from the closure member, a recess portion, and a brush member, with the disc shaped member having a width equal to the short distance which the second and third ribs are spaced, and wherein the disc shaped member can be snuggly interfitted within the channel portion and wherein the first liquid container can be positioned within the recess and abutted by the recess portion of the closure member.

44. The apparatus of claim 41 further comprising, in combination: a brush member, and means for providing a handle for gripping by the hand of the user, with the handle providing means comprising a disc shaped member having a width equal to the short distance which the second and third ribs are spaced, and wherein the disc shaped member can be snuggly interfitted within the channel portion.

45. The apparatus of claim 44 further comprising, in combination: a second liquid container including a closure member, wherein the closure member includes the disc shaped member vertically and perpendicularly upstanding from the closure member, the brush member, and a recess portion, and wherein the first liquid container can be positioned within the recess and abutted by the recess portion of the closure member.

46. The apparatus of claim 45 wherein the second liquid container includes an indented slot having a shape complementary to the third interlocking rib such that the second liquid container can be removably supported and positioned within the recess such that the third rib is located in the indented slot of the second liquid container and such that the second liquid container abuts with the second rib and the first liquid container.

47. The apparatus of claim 44 wherein the supportive, positional recess has a semi-circular cross section having a diameter; and wherein the disc shape member has a circular shape having a diameter equal to the diameter of the supportive, positional recess.

48. The apparatus of claim 47 wherein the interlocking ribs are generally parabolic in shape with the bottom of the parabola being generally at the same level as the bottom of the supportive, positional recess for providing a smooth bottom most portion so interference by the interlocking ribs with the liquid container is minimized.

49. Apparatus for cleaning records comprising, in combination: a body member having a top and including a handle portion for grasping by the fingers of the user; a cleaner element mounted to the body member; and a liquid container having a shape and including a closure member; and wherein the handle portion of the body member includes a supportive, positional recess extending into the top of the body member and having a shape complementary to and for receiving the liquid container, with the liquid container extending above and below the top of the body member, and wherein the apparatus further comprises means for positioning and maintaining the liquid container within the supportive, positional recess.

50. The apparatus of claim 49 wherein the cleaner element includes a cleaner member comprising, in combination: a form member including a first surface and a second, cleaningly directed surface, with the second surface having a cleaning area and a marginal edge; and record cleaning cloth positioned over the second surface of the form member and attached along the marginal edge of the form member and wherein the cleaner element further includes a casing member for receiving the cleaner member.

51. The apparatus of claim 50 wherein the casing member has a size and shape corresponding to the cleaner member and includes means for supporting the marginal edge of the cleaner member.

52. The apparatus of claim 51 wherein the casing member includes perimeter side walls and wherein the means for supporting the marginal edge of the cleaner member comprises a lip member attached to the sidewalls of the casing member and extending around the perimeter of the casing member.

53. The apparatus of claim 50 wherein the record cleaning cloth is only attached along the marginal edges and not in the cleaning area of the second surface of the form member.

54. The apparatus of claim 50 wherein the form member includes a first elongated trough member and a second elongated trough member parallel to and slightly spaced from the first trough member, with the trough members having inside and outside surfaces, with the outside surfaces of the trough members defining the cleaning area, and with the marginal edge defined by the remaining area around and between the first and second trough members.

55. The apparatus of claim 54 wherein the casing member has a size and shape corresponding to the cleaner member and includes means for supporting the marginal edge of the cleaner member.

56. The apparatus of claim 55 wherein the casing member includes perimeter side walls and wherein the means for supporting the marginal edge of the cleaner member comprises a lip member attached to the sidewalls of the casing member and extending around the perimeter of the casing member, and a support bar member extending between the side walls of the casing member for supporting the marginal edge of the cleaner member between the first and second trough members.

57. The apparatus of claim 56 wherein the support bar member is a brush back member and wherein the brush back member further includes brush bristles for use in cleaning records.

58. The apparatus of claim 54 wherein the record cleaning cloth is only attached along the marginal edges and not in the cleaning area of the second surface of the form member.

59. The apparatus of claim 49 wherein the cleaner element has a cleaning face and a supporting face; and wherein the cleaner element is pivotally mounted to the body member allowing the cleaner element to be positioned in a first, cleaning position where the cleaning face is exteriorly exposed of the body member allowing the cleaning face to be placed in cleaning contact with the records and in a second, storage position where the cleaning face is located within the interior of the body member and not exteriorly exposed of the body member for preserving the cleanliness of the cleaning face and avoiding contact between the cleaning face and other material thus preventing the material or the contaminants located thereon to be transferred to the cleaning face or the contaminants located on the cleaning face from being transferred to the material and for allowing the supporting face to be exteriorly exposed of the body member, with the pivotally mounting means comprising pivot pins attached to the cleaner element and extending through and pivotally mounted to the body member.

60. The apparatus of claim 49 wherein the positioning and maintaining means comprises, in combination: a first interlocking rib; a second interlocking rib, with the first and second interlocking ribs formed within the supportive, positional recess; a first interlocking groove member having a shape complementary with the first interlocking rib; and a second interlocking groove member having a shape complementary with the second interlocking rib, with the first and second interlocking groove members being formed on the liquid container such that the liquid container can be removably supported and positioned within the recess such that the first rib is located in the first groove member and the second rib is located in the second groove member allowing the liquid container to be snuggly interfitted within the recess.

61. The apparatus of claim 60 wherein the body member includes first and second upstanding sides, with the sides having a narrowed portion forming the handle portion; a right end wall; and a left end wall; and wherein the first interlocking rib is formed by the right end wall partially extending into the supportive, positional recess.

62. The apparatus of claim 61 further comprising, in combination: a third interlocking rib formed within the supportive positional recess spaced a short distance from the second interlocking rib on the side opposite the first interlocking rib for forming a channel portion within the recess between the second and third ribs.

63. The apparatus of claim 62 wherein the third interlocking rib is formed by the left end wall partially extending into the supportive, positional recess.

64. The apparatus of claim 60 wherein the supportive, positional recess has a semi-circular cross section having a diameter, and wherein the liquid container has a circular cross section, with the diameter of the liquid container being approximately equal to the diameter of the semi-circular cross section of the supportive, positional recess.

65. The apparatus of claim 64 wherein the interlocking ribs are generally parabolic in shape with the bottom of the parabola being generally at the same level as the bottom of the supportive, positional recess for providing a smooth bottommost portion so interference by the interlocking ribs with the liquid container is minimized.

66. The apparatus of claim 60 further comprising, in combination: a third interlocking rib formed within the supportive, positional recess spaced a short distance from the second interlocking rib on the side opposite the first interlocking rib for forming a channel portion within the recess between the second and third ribs.

67. The apparatus of claim 66 further comprising, in combination: a second liquid container, with the second liquid container including an indented slot having a shape complementary to the third interlocking rib such that the second liquid container can be removably supported and positioned within the recess such that the third rib is located in the indented slot of the second liquid container and such that the second liquid container abuts with the second rib and the first liquid container.

68. The apparatus of claim 67 wherein the second liquid container further includes a closure member, and wherein the closure member includes a disc shaped member vertically and perpendicularly upstanding from the closure member, a recess portion, and a brush member, with the disc shaped member having a width equal to the short distance which the second and third ribs are spaced, and wherein the disc shaped member can be snuggly interfitted within the channel portion and wherein the first liquid container can be positioned within the recess and abutted by the recess portion of the closure member.

69. The apparatus of claim 66 further comprising, in combination: a brush member, and means for providing a handle for gripping by the hand of the user, with the handle providing means comprising a disc shaped member having a width equal to the short distance which the second and third ribs are spaced, and wherein the disc shaped member can be snuggly interfitted within the channel portion.

70. The apparatus of claim 69 further comprising, in combination: a second liquid container including a closure member, wherein the closure member includes the disc shaped member vertically and perpendicularly upstanding from the closure member, the brush member, and a recess portion, and wherein the first liquid container can be positioned within the recess and abutted by the recess portion of the closure member.

71. The apparatus of claim 70 wherein the second liquid container includes an indented slot having a shape complementary to the third interlocking rib such that the second liquid container can be removably supported and positioned within the recess such that third rib is located in the indented slot of the second liquid container and such that the second liquid container abuts with the second rib and the first liquid container.

72. The apparatus of claim 69 wherein the supportive, positional recess has a semi-circular cross section having a diameter; and wherein the disc shaped member has a circular shape having a diameter equal to the diameter of the supportive, positional recess.

73. The apparatus of claim 72 wherein the interlocking ribs are generally parabolic in shape with the bottom of the parabola being generally at the same level as the bottom of the supportive, positional recess for providing a smooth bottom most portion so interference by the interlocking ribs with the liquid container is minimized.

74. The apparatus of claim 49 wherein the cleaner element has a cleaning face and a supporting face; and wherein the cleaner element is pivotally mounted to the body member allowing the cleaner element to be positioned in a first, cleaning position where the cleaning face is exteriorly exposed of the body member allowing the cleaning face to be placed in cleaning contact with the records and in a second, storage position where the cleaning face is located within the interior of the body member and not exteriorly exposed of the body member for preserving the cleanliness of the cleaning face and avoiding contact between the cleaning face and other material thus preventing the material or the contaminants located thereon to be transferred to the cleaning face or the contaminants located on the cleaning face from being transferred to the material and for allowing the supporting face to be exteriorly exposed of the body member, with the pivotally mounting means comprising pivot pins attached to the cleaner element and extending through and pivotally mounted to the body member.

* * * * *